W. H. GLEESON.
HOSE CLAMP AND HOLDER.
APPLICATION FILED APR. 24, 1911.

1,008,027.

Patented Nov. 7, 1911.

WITNESSES
F. C. Fliedner
N. B. Keating

INVENTOR,
Wm H. Gleeson,
By F. M. Wright
Attorney.

UNITED STATES PATENT OFFICE.

WILLIAM H. GLEESON, OF SAN FRANCISCO, CALIFORNIA.

HOSE CLAMP AND HOLDER.

1,008,027. Specification of Letters Patent. Patented Nov. 7, 1911.

Application filed April 24, 1911. Serial No. 623,113.

*To all whom it may concern:*

Be it known that I, WILLIAM H. GLEESON, a citizen of the United States, residing at San Francisco, in the county of San Francisco and State of California, have invented new and useful Improvements in Hose Clamps and Holders, of which the following is a specification.

The object of the present invention is to provide a device for clamping hose, and especially fire hose, which will facilitate the movement of the fire hose by the firemen, and also the supporting of the hose when at rest and inclining the same in the desired direction.

Figure 1:
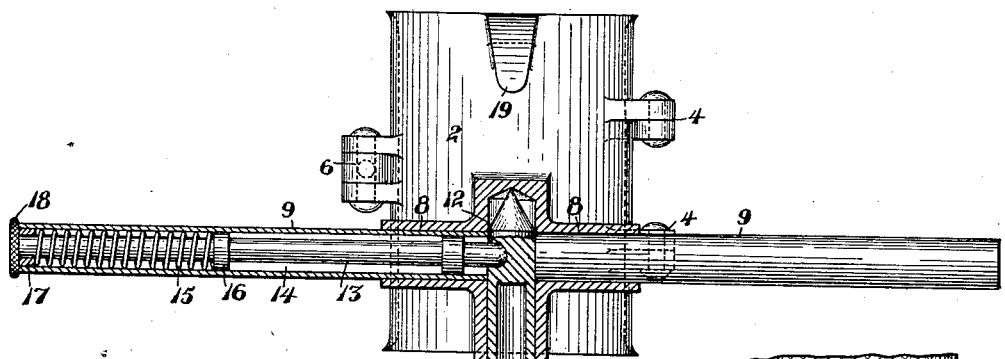
Figure 2:
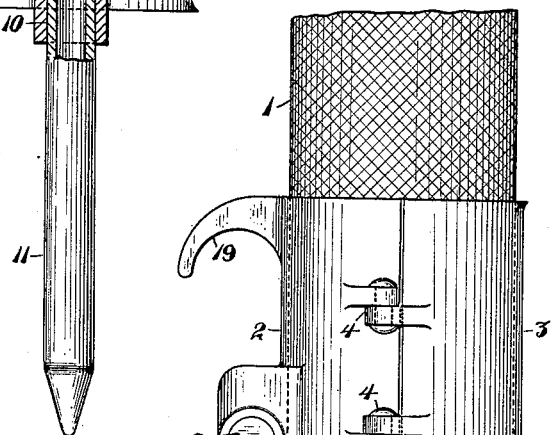
Figure 3:
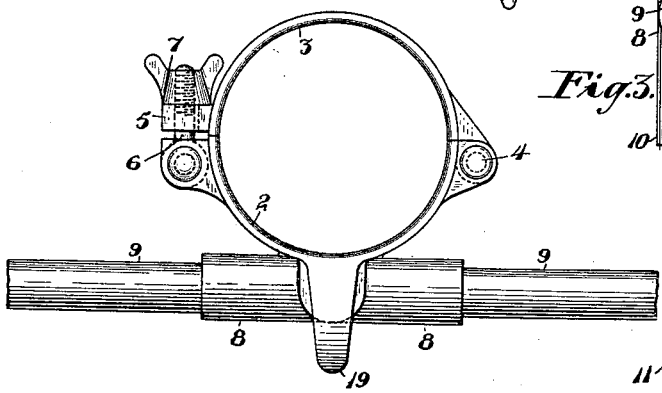

In the accompanying drawing, Figure 1 is a front view of the device, certain parts being shown in section; Fig. 2 is a broken plan view thereof; Fig. 3 is a side view thereof, the hose being shown in position.

Referring to the drawing, 1 indicates a portion of hose to which my device is shown as applied. Said device comprises two semi-cylindrical sections 2, 3, hinged together, as shown at 4, and provided diametrically opposite to said hinges 3, the one with spaced lugs 5, and the other with a pivoted bolt 6 to extend between said lugs, there being screwed upon the projecting end of said bolt a thumb nut 7. By this contrivance the device can be very firmly clamped around the hose.

The section 2 of the device is formed with horizontal cylindrical sockets 8 to receive the ends of handles 9, preferably tubular, which handles can be grasped by two firemen, so that the hose can be raised and transported to any place or position desired. Between said horizontal sockets is a vertical socket 10 closed at the top, into which can enter from the bottom a tubular post or spike 11. Said post has in a side thereof an aperture 12, which, when the post is in the proper position in said socket, is adapted to receive the end of a locking bolt 13 guided through a guideway 14 in one of the tubes 9 and pressed by a spring 15, one end of which presses against a collar 16 on said bolt, the other end of the spring pressing against a sleeve 17 secured in said tube 9, said bolt having a head 18 by which it can be withdrawn from said aperture 12. This construction permits the spike to be removed when desired, and also posts or spikes of various lengths to be inserted, thus enabling the hose to be supported at various heights from the ground. The section 2 is also formed with a hook 19, which is adapted to hook over and engage a balcony or the rung of a ladder and support the hose thereby.

I thus provide, in this device, means for facilitating the change of position of the hose, and for enabling it to be supported in various positions.

I claim:—

A hose clamp consisting of two semi-cylindrical sections hinged together, one of said sections being provided with oppositely extending cylindrical sockets to receive the ends of handles and being also provided with a vertical socket to receive a supporting post or spike, said spike having a recess in its side and one of said handles being hollow, a spring-actuated bolt in said hollow handle, the end of which bolt is adapted to enter the recess in the spike, the end of the bolt having a head adapted to lie close against the end of the hollow handle.

In testimony whereof I have hereunto set my hand in the presence of two subscribing witnesses.

WILLIAM H. GLEESON.

Witnesses:
 FRANCES M. WRIGHT,
 N. B. KEATING.

Copies of this patent may be obtained for five cents each, by addressing the "Commissioner of Patents, Washington, D. C."